United States Patent [19]

Chan

[11] Patent Number: 5,381,201

[45] Date of Patent: Jan. 10, 1995

[54] FILM CARTRIDGE

[75] Inventor: Yet Chan, Hong Kong, Hong Kong

[73] Assignee: Achiever Industries Limited, Kowloon, Hong Kong

[21] Appl. No.: 33,903

[22] Filed: Mar. 18, 1993

[30] Foreign Application Priority Data

Mar. 18, 1992 [GB] United Kingdom ............ 9205912

[51] Int. Cl.⁶ .................................. G03B 17/26
[52] U.S. Cl. .................................... 354/275
[58] Field of Search .............. 354/275, 222, 276

[56] References Cited

U.S. PATENT DOCUMENTS 4,887,111 12/1989 Hsiung .................... 354/275
4,973,997 11/1990 Harvey ................. 354/222 X

FOREIGN PATENT DOCUMENTS

4014418A1 11/1991 Germany .
1421941 1/1976 United Kingdom .

Primary Examiner—Howard B. Blankenship
Attorney, Agent, or Firm—Blakely, Sokoloff, Taylor & Zafman

[57] ABSTRACT

A film cartridge is disclosed which comprises a film supply chamber 130 and a film take-up chamber 140 having a film wind-on spindle 150 rotatably mounted therein with a film connected to the spindle extending between the chambers via a film transport path in which a film exposure window is disposed. The cartridge is of such a size as to be compatible with a 126 format camera but the film exposure window is of full frame 135 format size.

6 Claims, 3 Drawing Sheets

FILM CARTRIDGE

BACKGROUND AND FIELD OF THE INVENTION

This invention relates to a film cartridge.

Cameras which use a pop-in cartridge which encloses the film have been known for many years, for example as manufactured by Kodak under their trade mark "IN-STAMATIC". Such cameras are extremely easy to operate, generally requiring the user only to insert the film cartridge into the camera, close the back, wind the film on and then take a photograph.

The cartridge comprises a casing, with the unexposed film stored in a film supply chamber of the casing in a roll and connected to a spindle in a take-up chamber of the casing via a film transport path in which a film exposure window is disposed. The film includes a backing sheet indicating the picture frame number which is visible through an opening in the casing, thus obviating the need for any external mechanism in the camera for performing this function.

A winder on the camera engages the spindle to advance the film between frames and the film is provided, at frame intervals, with an opening on one longitudinal side which is engaged by a spigot of the camera. As the spigot engages a side of the opening, the spigot is pulled to an upright locked position which holds the film at the correct position to take a further photograph. The action of movement of this spigot also cocks the shutter allowing a picture to be taken. When the shutter release is pressed, this automatically releases the locked spigot thus allowing the film to be advanced again.

Although the film cartridge is of somewhat more complex construction than ordinary roll film, this does allow the camera to be of very simple construction, thus leading to reduce manufacturing cost and providing an inexpensive, simple to operate camera suitable particularly for children.

The film format used in such cameras is what is termed "126" format film which produces a 28 mm square frame negative. While capable of producing acceptable results in good light, 126 square frame film does not produce such an aesthetically pleasing picture format as, for example, standard 135 or 35 mm film which uses a negative of 24 mm width and 36 mm length, i.e. in a rectangular format.

Proposals have been made to provide the advantages of a rectangular format with 126 format film by restricting the exposure area to province a negative with a length of 28 mm but with a reduced width to produce a negative of the same side to edge ratio as 135 format film but of a reduced size. It is a disadvantage of such a proposal, however, that if the negative is enlarged by conventional processing equipment, reduced size prints are obtained and it is necessary to provide special equipment to make the additional enlargement necessary to provide a "full size" prints from the reduced size negative.

SUMMARY OF THE INVENTION

According to the invention there is provided a film cartridge comprising a film supply chamber, a film take-up chamber having a film take-up spindle mounted therein, the chambers being connected via a film transport path in which a film exposure window is disposed, the cartridge being operable by a 126 format camera and wherein the film exposure window is of full frame 195 format size.

The inventors have found that, contrary to generally accepted belief, it is possible to design a film cartridge which is operable by a standard 126 format camera of the kind described above but which includes a film exposure window of full frame 35 mm dimensions.

A feature of the film cartridge according to the invention is that the edge of the film window is slanted at an angle corresponding to the angle of incidence of light rays passing through the camera lens, so that maximum frame area is provided with a minimal reduction in window structure.

BRIEF DESCRIPTION OF THE DRAWINGS

An embodiment of the invention will now be described, by way of example, with reference to the accompanying drawings in which:

FIG. 6 is a perspective view of a 126 format camera suitable for use with the present invention.

DETAILED DESCRIPTION OF THE PREFERRED EMBODIMENT

Figure 1:
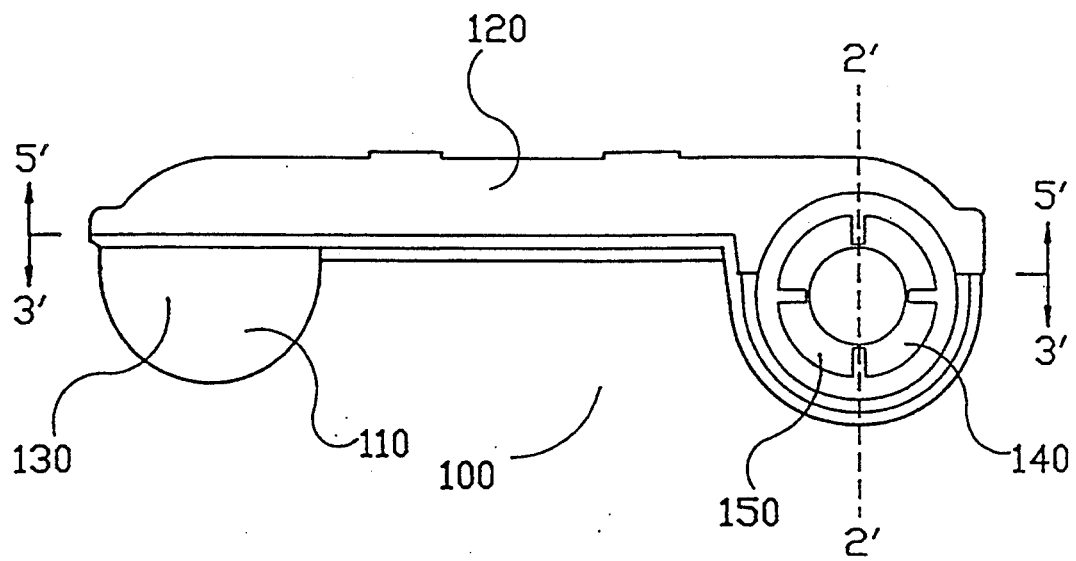
FIG. 1 is a side view of an embodiment of a film cartridge in accordance with the invention.
Figure 2:
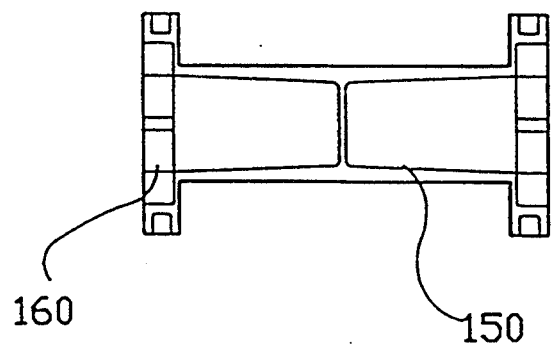
FIG. 2 is an axial cross sectional view of a spindle of FIG. 1 through 2'—2' in the plane of the paper.
Figure 3:
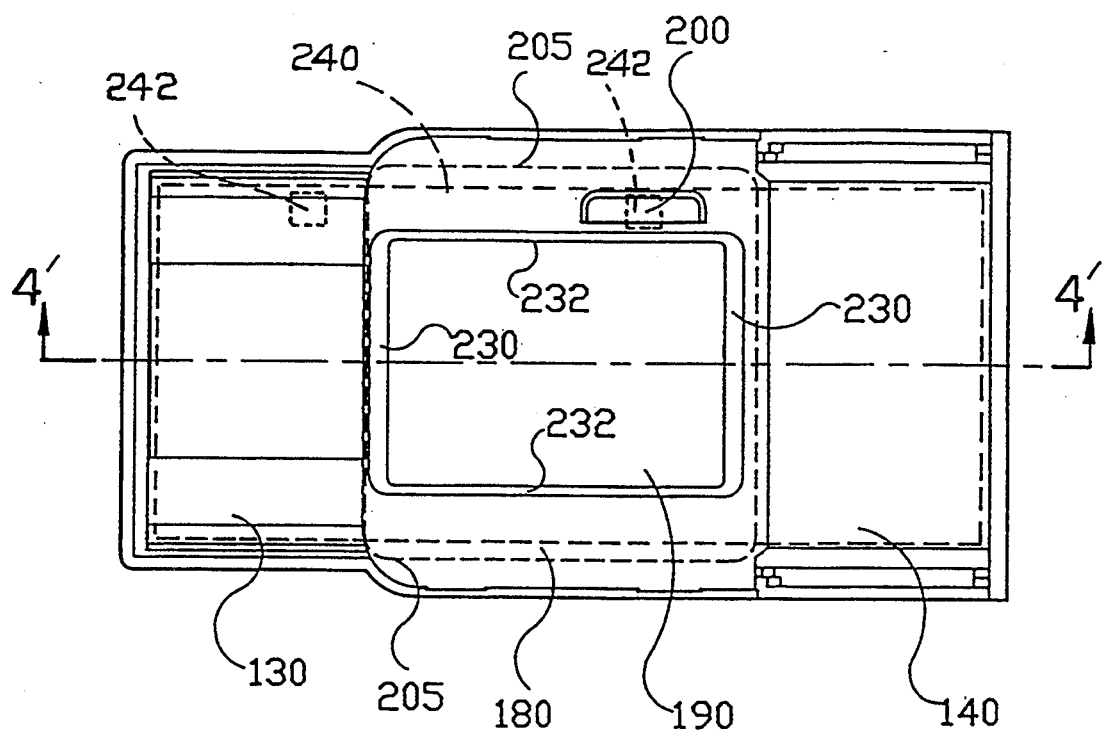
FIG. 3 is an internal view through 3'—3' of FIG. 1 in the plane of the paper of a first component of the casing of the embodiment of the invention.

With reference to the drawings, the film cartridge illustrated comprises a casing 100 formed from a first component 110 and a second component 120 which are permanently sealed together to form, with the exception of a film exposure window, a light sealed unit. The casing defines two chambers, a film supply chamber 130 and a film take-up chamber 140. A rotatable film take-up spindle 150 is disposed in the chamber 140 and a film 240 shown as phantam lines in FIG. 3 is stored in the film supply chamber and connected at one end to the film take-up spindle 150 via a film transport path 180 in which a film exposure window 190 is formed, as is best shown in FIG. 3. The spindle 150 can be rotated by engagement of a film wind on mechanism 248 of a 126 format camera 250, as shown in FIG. 6, which engages end 160 of the spindle in an interlocking manner, thus advancing the film 240.

The cartridge 100 1 is dimensioned so as to be receivable in a 126 format camera 250 shown in FIG. 6. Separation distance and approximate dimensions of the chambers 130, 140 are the same as for a 126 format cartridge. However, unlike prior art 126 format cartridges, the film exposure window 190 of the described embodiment is of at least full frame 135 format.

Figure 4:
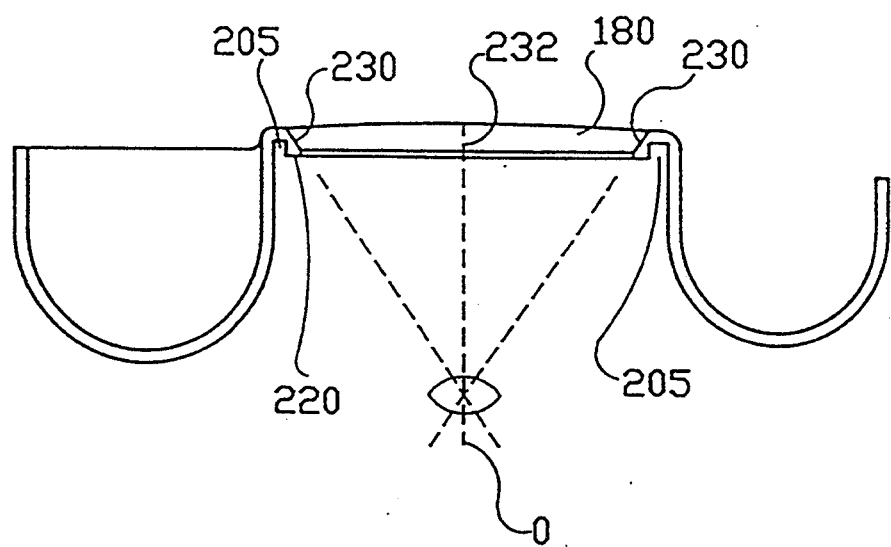
FIG. 4 is a simplified view through the plane 4'—4' of FIG. 3.
Figure 5:
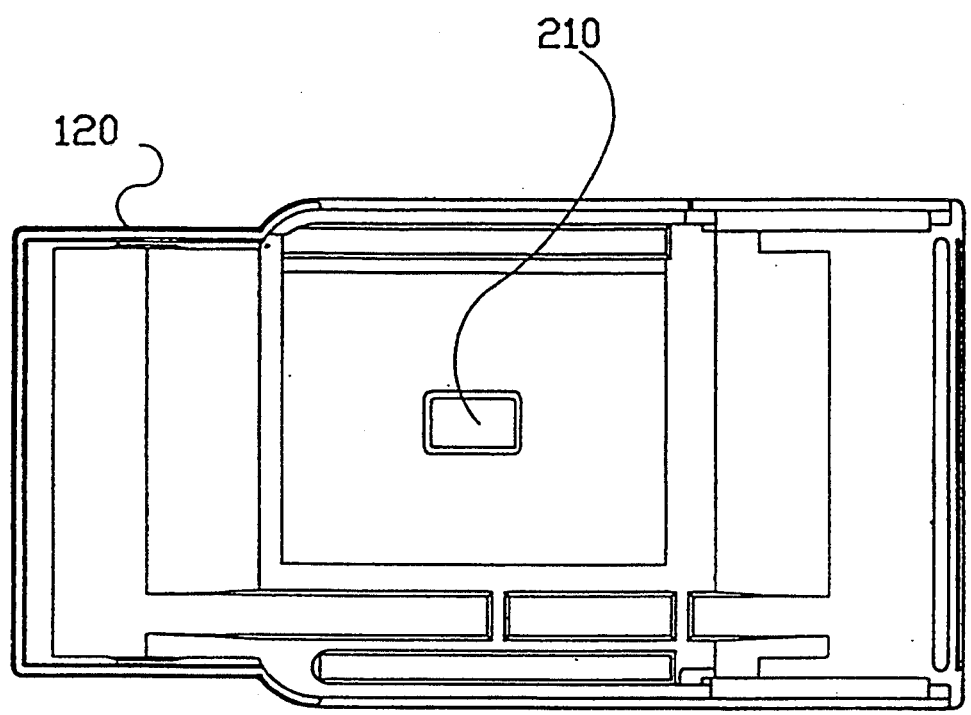
FIG. 5 is a view in the plane 5'—5' of FIG. 1 showing an internal view of a second component of the casing of the embodiment of the invention.

The window 190 is provided with a peripheral channel 205 (shown in plan in dotted lines in FIG. 3 and in cross section in FIG. 4) which engages a corresponding rib (not shown) that projects from the camera body of a standard 126 format camera. The rib engages the base of the channel 205 to set the distance between the lens and the image plane/film transport path 180. Edges 230 of a ledge 220 which forms a side of the channel 205 are slanted at an angle A of 34.6°) to the lens principal axis O corresponding to the angle of incidence that light from the lens strikes the edge of the film window as shown in FIG. 4. Slanting the edges 230 in this way allows the peripheral channel structure of the window, which is an essential feature of conventional 126 camera design to be retained as the slanted edges at their minimum extent allow the formation of the channel structure, while at their maximum extent, in the film transport path 180, allow the window dimensions to be of full frame 135 size.

The longitudinal edges 232 do not have the space constraint caused by channel 205 and thus need not be bevelled in the same way. However, if desired, these edges can be slanted at a steeper angle (typically $\approx 60°$) as they are closer to the lens principal axis O.

In order to compensate for non-planar variations in the focal plane, which are particularly noticeable for high f number, e.g. f16 lenses, which are used in such simple cameras to keep manufacturing cost low, the film transport path 180 is of slightly arcuate form, in the film transport direction, to maintain a constant lens-image plane distance, in the film transport direction.

The film retained 240 within the cartridge 100 is of exactly the same width dimension as 126 film, which is sufficient to accommodate the width dimension of a 135 negative. The film 240 includes a backing sheet to indicate the film frame number, an opening 210 is in casing portion 120 for viewing the film exposure number on the backing sheet. The film registration mechanism is exactly the same as for a normal 126 cartridge film, as described in the prior art, in that openings 242 shown in FIG. 3 are provided at frame intervals along the length of the film 240 which are engaged by a spigot of the camera through an opening 200 in the cartridge. However, as the 135 frame is wider than a 126 frame, the distance between the openings along the film is larger to allow for the length of the negative as well as a gap on either side of the negative to provide a break between negatives. Thus, the frame openings 242 would have to be spaced at least 36 mm apart and would typically be spaced about 38 mm apart. It should be noted that the film is not the same as conventional 135 film which is provided with two lines of openings on either longitudinal edge, for engagement with a conventional ratchet mechanism film advance.

Preferably, the film cartridge 100 is used with a 126 format camera 250 in FIG. 6 with a view finder 254 adapted to indicate the 135 exposure area. However, in a further preferred form, such a camera may be provided with replacement view finders, or view finder masks, so that either 126 or 135 format exposure areas may be indicated by the camera in dependence upon the film chosen for use.

What is claimed is:

1. A film cartridge operable by a 126 format camera comprising casing means defining a film supply chamber, a film take-up chamber having a film wind-on spindle, the chambers being connected via a film transport path in which a film exposure window formed and defined in the casing means is disposed, and wherein the film exposure window is of at least full frame 135 format size, and at least one peripheral edge of the film exposure window is slanted.

2. A cartridge as claimed in claim 1 wherein said peripheral edge is slanted at the angle of incidence at which light from a camera lens falls upon the edge.

3. A film cartridge as claimed in claim 1 wherein the exposure window is provided with a peripheral channel engageable with a corresponding rib of said camera.

4. A film cartridge as claimed in claim 1 further comprising a film, the film being disposed within the cartridge and connected at one end to the spindle and being provided with a plurality of openings for frame registration at regular intervals along one longitudinal edge, the openings being at least 36 mm apart.

5. A cartridge as claimed in claim 4 wherein the openings are at least 38 mm apart.

6. A cartridge as claimed in claim 1 wherein said film transport path is of arcuate form.

* * * * *